US009531831B1

United States Patent
Cuadrat et al.

(10) Patent No.: US 9,531,831 B1
(45) Date of Patent: Dec. 27, 2016

(54) ACTIVE SUBSCRIPTION PROFILES ON SECURE ELEMENT SUPPORTING CONCURRENT USAGE OF NETWORK SERVICES

(71) Applicant: Verizon Patent and Licensing Inc., Arlington, VA (US)

(72) Inventors: Ruben Cuadrat, New York, NY (US); Warren Hojilla Uy, Randolph, NJ (US); Manuel Enrique Caceres, Basking Ridge, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/091,220

(22) Filed: Apr. 5, 2016

(51) Int. Cl.
*H04W 4/00* (2009.01)
*H04L 29/08* (2006.01)
*H04B 1/3816* (2015.01)
*H04L 29/06* (2006.01)

(52) U.S. Cl.
CPC .......... *H04L 67/303* (2013.01); *H04B 1/3816* (2013.01); *H04L 65/1016* (2013.01)

(58) Field of Classification Search
None
See application file for complete search history.

(56) References Cited

U.S. PATENT DOCUMENTS

| | | | | |
|---|---|---|---|---|
| 7,359,704 B1* | 4/2008 | Dizdarevic | ............. | H04W 8/28 455/428 |
| 8,948,057 B2* | 2/2015 | Ku | ...................... | H04L 63/0853 370/260 |
| 2006/0133319 A1* | 6/2006 | Kant | ....................... | H04L 63/10 370/331 |
| 2008/0153488 A1* | 6/2008 | Ruhanen | ........... | H04L 29/12132 455/435.1 |
| 2009/0113525 A1* | 4/2009 | Rajan | .................... | H04L 63/102 726/4 |
| 2010/0042525 A1* | 2/2010 | Cai | ........................ | G06Q 20/20 705/35 |
| 2010/0130227 A1* | 5/2010 | Farthofer | ................ | H04W 8/10 455/456.1 |
| 2010/0188869 A1* | 7/2010 | Fredette | .................. | H02M 1/10 363/15 |
| 2011/0026930 A1* | 2/2011 | Cui | ....................... | H04B 10/272 398/115 |
| 2011/0212705 A1* | 9/2011 | Sprigg | .............. | H04M 3/42042 455/410 |
| 2012/0272266 A1* | 10/2012 | Ou | ........................ | G06Q 30/02 725/34 |

(Continued)

*Primary Examiner* — Dominic Rego

(57) ABSTRACT

A method, a device, and a non-transitory storage medium provide storing multiple subscription profiles on a secure element; detecting a triggering event; using, by a first stack of a wireless end device, one of the subscription profiles to register with a first network service via a first network; indicating that the one of the subscription profiles is enabled; querying, by a second stack of the wireless end device, the secure element for another one of the subscription profiles; obtaining, by the second stack, access information to the other one of the subscription profiles; selecting, by the second stack, the other one of the subscription profiles; using, by the second stack, the other one of the subscription profiles to register with a second network service via a second network; and indicating that the other one of the subscription profiles is enabled.

20 Claims, 16 Drawing Sheets

(56) References Cited

U.S. PATENT DOCUMENTS

2014/0007200 A1* 1/2014 Zisimopoulos ....... H04L 63/102
 726/4
2014/0369267 A1* 12/2014 Ni ......................... H04W 76/02
 370/329

* cited by examiner

162

ACTIVE SUBSCRIPTION PROFILES ON SECURE ELEMENT SUPPORTING CONCURRENT USAGE OF NETWORK SERVICES

BACKGROUND

A Subscriber Identification Module (SIM) card is used on various mobile devices. The SIM card may be implemented as a Universal Integrated Circuit Card (UICC) configured with an application and data that enables the mobile device to access a wireless network.

DETAILED DESCRIPTION OF PREFERRED EMBODIMENTS

Figure 1:
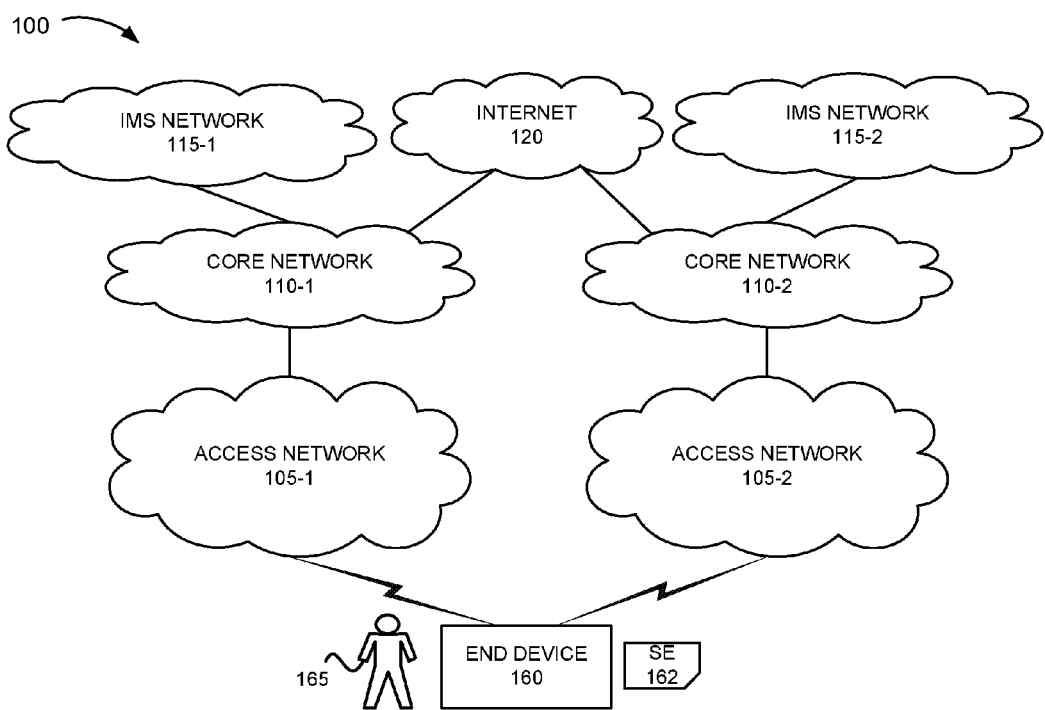
FIG. 1 is a diagram illustrating an exemplary environment in which an exemplary embodiment of multi-active profiles-based network services may be implemented.

The following detailed description refers to the accompanying drawings. The same reference numbers in different drawings may identify the same or similar elements. In addition, the following detailed description does not limit the invention.

There are a variety of wireless devices and architectures surrounding SIM cards and the applications stored on them. For example, a wireless device may include multiple SIM trays to support multiple SIM cards. However, when in use, only one subscription is active at a time. While the wireless device may support multiple radio frequencies (RFs), which would allow for simultaneous calls, the cost of the wireless device is significantly increased. According to an alternate architecture (e.g., 3GPP technical specification (TS) 31.102), a wireless device may support a single SIM card that includes multiple Universal SIMs (USIMs). The USIM application enables the wireless device to access a Long Term Evolution (LTE) network and a Third Generation Partnership Project (3GPP) legacy network. However, when in use, only one telephone number is active at a time. The embedded UICC (eUICC) (also known as embedded SIM or eSIM) technology allows the download of multiple profiles to a single UICC. This architecture may be considered analogous to a wireless device that includes multiple SIM trays. However, when in use, there is no ability to perform multi-persona scenarios. Rather, the GSM Association (GSMA) technical specification (e.g., Remote SIM Provisioning (RSP) Architecture, Version 1.0, 23 Dec. 2015, requirement no. EUICC5, etc.) limits one mobile network operator (MNO) subscription to be enabled at any point in time.

According to an exemplary embodiment, a single radio device and a secure element provide multi-active profiles-based network services in which multiple subscription profiles stored on the secure element can be active simultaneously and the single radio device can be connected to multiple network services of a single carrier or of multiple carriers. Each subscription profile includes data needed for the user and the single radio device to be granted access and use of the network service. In this regard, the network service may be any service in which the subscription profile stored on the secure element can be used to grant access and use of the network service. According to an exemplary implementation, the network service is an Internet Protocol Multimedia Subsystem (IMS) network that offers a service, such as voice, instant messaging, etc. According to another exemplary implementation, the network service may be another type of network or network device that offers an end user service or application, a rich communication service (RCS), or other type of service. According to one exemplary implementation, the multiple network services are the same. For example, the user may, via the single radio device, which includes the secure element, place and receive telephone calls with multiple telephone numbers associated with multiple active subscriptions of a single carrier or of different carriers, simultaneously. According to another exemplary implementation, the network services may be different. For example, one network service may be a voice service and the other network service may be a messaging service.

According to an exemplary implementation, the secure element includes an eUICC, a UICC, or other platform (e.g., logic of the single radio device). According to an exemplary embodiment, the secure element stores a file or an applet (e.g., a container) that includes a list of available subscription profiles. According to an exemplary embodiment, the secure element permits multiple subscription profiles to be enabled or active at the same time. The file or the applet is always available for use regardless of the state (e.g., active, inactive, enabled, disabled, etc.) of other subscription profiles (e.g., mobile network operator subscriptions) stored on the secure element. Each subscription profile includes data that can be used to allow the user and the single radio device access and use of the network service. For example, the subscription profile may include a user identifier, a device identifier, a key, a network address, a network identifier, and/or other types of data (e.g., a credential, a password, a certificate, etc.) that may be configured by a network service provider or mobile network operator to enable the user and the single radio device to access and use the network service. For example, the subscription profile includes data that permits a network, a network device, and/or a network service to authenticate and/or authorize the user and/or the single radio device. Additionally, or alternatively, the subscription profile may include data that permits the user and the single radio device to register with the network service. According to an exemplary implementation, the subscription profiles of the list include an IMS subscription profile. According to another exemplary implementation, the subscription profiles of the list pertain to another type of network, network device, and so forth, via which the network service is offered. According to an exemplary embodiment, the list of subscription profiles can be updated, such as adding a subscription profile or deleting a subscription profile.

According to an exemplary embodiment, the single radio device includes a protocol stack that is used to connect to and use the network service. For example, the protocol stack can use a subscription profile stored on the secure element, and allow the user/single radio device to access and use the corresponding network service. According to an exemplary implementation, the protocol stack is implemented as a part of the communication interface of the single radio device. By way of further example, the protocol stack may be implemented as a part of and/or executable by the baseband processor.

According to an exemplary embodiment, in addition to the protocol stack of the communication interface, the single radio device includes one or multiple additional protocol stacks. According to an exemplary implementation, the additional protocol stack is implemented as a part of and/or executable by the application processor. According to another exemplary implementation, the additional protocol stack is implemented as a part of the communication interface. The additional protocol stack can use a subscription profile stored in the list of the secure element, and allow the user/single radio device to access and use the network service. In this way, the single radio device is enabled to simultaneously attach to multiple network services based on the subscription profiles stored on the secure element. For example, different IMS clients/services are simultaneously operational on the single radio device.

FIG. 1 is a diagram illustrating an exemplary environment 100 in which an exemplary embodiment of multi-active profiles-based network services may be implemented. As illustrated, environment 100 includes an access networks 105-1 and 105-2 (also referred to as access networks 105 and, individually or generically as access network 105), core networks 110-1 and 110-2 (also referred to as core networks 110 and, individually or generically as core network 110), IMS networks 115-1 and 115-2 (also referred to as IMS networks 115 and, individually or generically as IMS network 115), and Internet 120. Environment 100 further includes an end device 160, a secure element (SE) 162, and a user 165.

The number of the number of end devices, the number of networks, and the arrangement in environment 100 are exemplary. According to other embodiments, environment 100 may include an additional network and/or arrangement of networks that is/are different from that illustrated in FIG. 1. For example, a network that is different from IMS network (e.g., IMS network 115) and/or Internet 120 may be implemented as an external network relative to core network 110. For example, the external network may be packet-switched network, a public network, a private network, an IPv4 network, an IPv6 network, a data network, or some other type of network. As further illustrated, environment 100 includes various communicative links. Environment 100 may be implemented to include wireless (e.g., radio, etc.) and/or wired (e.g., electrical, optical, etc.) communicative links. The communicative link between end device 160 and a network or between networks may be direct or indirect. For example, an indirect communicative link may involve an intermediary network element and/or an intermediary network not illustrated in FIG. 1. Additionally, the number of communicative links and the arrangement of communicative links illustrated in environment 100 are exemplary.

Access network 105 includes one or multiple networks of one or multiple types. For example, access network 105 may be implemented to include a wireless network. According to an exemplary implementation, access network 105 includes a radio access network (RAN). For example, the RAN may be a Third Generation (3G) RAN, a Fourth Generation (4G) RAN, a Fifth Generation (5G) RAN, a future generation wireless network architecture, etc. By way of further example, access network 105 may include an Evolved UMTS Terrestrial Radio Access Network (E-UTRAN) of a Long Term Evolution (LTE) network or LTE-Advanced (LTE-A) network, a U-TRAN, a Universal Mobile Telecommunications System (UMTS) RAN, a Global System for Mobile Communications (GSM) RAN, a Wideband Code Division Multiple Access (WCDMA) RAN, an Ultra Mobile Broadband (UMB) RAN, a Code Division Multiple Access (CDMA) RAN, a High-Speed Packet Access (HSPA) RAN, an Evolution Data Optimized (EV-DO) RAN, or the like (e.g., a Worldwide Interoperability for Microwave Access (WiMAX access network, other type of public land mobile network (PLMN), etc.). Depending on the implementation, access network 105 may include various network elements, such as a base station (BS), a base transceiver station (BTS), a Node B, an evolved Node B (eNB), a BS controller (BSC), a radio network controller (RNC), a femto device, a pico device, a home eNB, a relay node, a wireless access point, or other type of wireless node that provides wireless access. Access network 105 may include a wired network. For example, access network 105 may include an optical network or a cable network.

Core network 110 includes one or multiple networks of one or multiple types. For example, core network 110 may be implemented to include a wireless network and/or a wired network. According to an exemplary implementation, core network 110 includes a complimentary network pertaining to the one or multiple RANs described above. For example, core network 110 may include an evolved packet core (EPC) network of an LTE network or an LTE-A network, a GPRS core network, etc. Depending on the implementation, core network 110 may include various network elements, such as a packet data network gateway (PGW), a serving gateway (SGW), a mobility management entity (MME), a Gateway General Packet Radio Service (GPRS) Support Node (GGSN), a Serving GPRS Support Node (SGSN), a Packet Data Serving Node (PDSN), a High Rate Packet Data (HRPD) Serving Gateway (HSGW), etc, to provide core network functions, as well other network elements pertaining to various network-related functions, such as billing, security, network polices, subscriber profiles, etc. Core network 110 may also include other network elements to support internetworking between networks.

IMS network 115 includes network elements of an IMS system. For example, although not illustrated, IMS network 115 includes a Proxy Call Session Control Function (P-CSCF), an Interrogating-CSCF (I-CSCF), a Serving-CSCF (S-CSCF), an Emergency-CSCF (E-CSCF), and so forth. IMS network 115 also includes network elements that provide end users with various applications and/or services, such as voice, data, instant messaging, video, multimedia, etc. For example, IMS network 115 includes various application servers. Internet 120 is the Internet. The Internet may include various network elements that provide various services, applications, and so forth.

End device 160 includes a device that has computational and wireless communicative capabilities. End device 160 may be implemented as a mobile device, a portable device, a wearable device, or a stationary device. For example, end device 160 may be implemented as a smartphone, a mobile telephone, a personal digital assistant, a tablet, a netbook, a phablet, a laptop, an infotainment system in a vehicle, a watch, a music playing device, an Internet device, a gaming device, etc.

According to an exemplary embodiment, end device 160 is a single radio device. For example, according to an exemplary implementation, end device 160 includes radio-frequency logic, which includes a single transmitter chain and a single receiver chain. According to another exemplary implementation, end device 160 includes radio frequency logic, which includes a single transmitter chain and two or more receiver chains that operate on the same frequency (e.g., connected to a same local oscillator) for multiple input multiple output (MIMO) communication. End device 160 may support one or multiple radio access technologies (RATs). For example, end device 160 may be configured to wirelessly communicate according to various RATs, such as LTE, LTE-A, GSM, HSPA, EV-DO, UMTS, CDMA (e.g., CDMA2000, 1×RTT, etc.), and so forth.

End device 160 stores one or multiple end user applications. For example, end device 160 may include a telephone application, a multi-media application, a video call application, an e-mail application, a contacts application, a calendar application, an instant messaging application, a web browsing application, a location-based application (e.g., a Global Positioning System (GPS)-based application, etc.), a social networking application, a camera application, a toolbar application, and so forth.

According to an exemplary embodiment, in addition to a native protocol stack, end device 160 includes one or multiple additional protocol stacks. According to an exemplary implementation, the additional protocol stack is implemented as a part of and/or executable by an application processor. According to another exemplary implementation, the additional protocol stack is implemented as a part of the communication interface. For example, the additional protocol stack may be implemented as a part of the baseband processor, the modem, or other component. The additional protocol stack provides a service or a function of the native protocol stack. For example, the additional protocol stack may include a set of libraries, executables, and/or a program to provide networking capabilities.

According to an exemplary implementation, the additional protocol stack includes a client that manages the access and enablement of a network service based on a subscription profile stored on secure element 162. For example, the client manages a registration process, which includes authentication and/or authorization of user 165 and/or end device 160, with a network device. Additionally, according to an exemplary embodiment, the native protocol stack manages the access and enablement of another network service based on another subscription profile stored on secure element 162. For example, the native protocol stack manages a separate registration process, which includes authentication and/or authorization of user 165 and/or end device 160, with another network device. In this way, the native protocol stack and the additional protocol stack can support two (or more) services offered by one or multiple carriers in which user 165 and/or end device 160 is authenticated and/or authorized to use each network service. Additionally, the two (or more) network services may afford user 165 with different personas.

According to an exemplary implementation, the additional protocol stack includes an IMS stack. For example, the IMS stack includes an IMS client that manages the registration process between end device 160 and IMS network 115-1 and further signaling required for use of a service offered by IMS network 115-1 (e.g., voice, video, etc.). The IMS stack would use the subscription profile and logic of secure element 162 to provide this service. Additionally, for example, a native IMS stack manages the registration process between end device 160 and IMS network 115-2 (e.g., of a same or different carrier) and further signaling required for use of a service offered by IMS network 115-2 (e.g., voice, video, etc.).

According to an exemplary use case, user 165 may register with IMS networks 115 via end device 160, which includes secure element 162, for voice services and allow user 165 to place and receive voice calls via multiple telephone numbers simultaneously. Additionally, as described herein, in contrast to existing technical specifications of a secure element (e.g., a UICC, an eUICC, etc.), secure element 162 provides that multiple subscription profiles can be active at the same time. Thus, the additional IMS stack may use one subscription profile stored by secure element 162 and the native IMS stack may use another subscription profile stored by secure element 162.

Secure element 162 includes a platform that hosts an application and stores subscription profiles. According to one example, secure element 162 may be implemented as an eUICC. According to another example, secure element 162 may be implemented as a UICC or other type of form factor. According to yet another example, secure element 162 may be implemented as a part of the modem of end device 160 or another entity of end device 160. Depending on the implementation, secure element 162 may be embedded or fixed on (e.g., relative to other hardware of end device 160 (e.g., a circuit board, etc.)) or may be removable from end device 160. Secure element 162 may include various components, such as a processor, a memory, and instructions that provide the multi-active profiles-based network services. According to an exemplary embodiment, secure element 162 includes a memory that stores a file or an applet (e.g., a container) that includes a list of available subscription profiles. According to an exemplary implementation, the subscription profiles include IMS subscription profiles that permit user 165 to register with and use IMS networks 115. According to other exemplary implementations, the subscription profiles permit user 165 to register with services, applications, web sites, etc., residing in Internet 120. User 165 is a person that operates end device 160.

Figure 2:
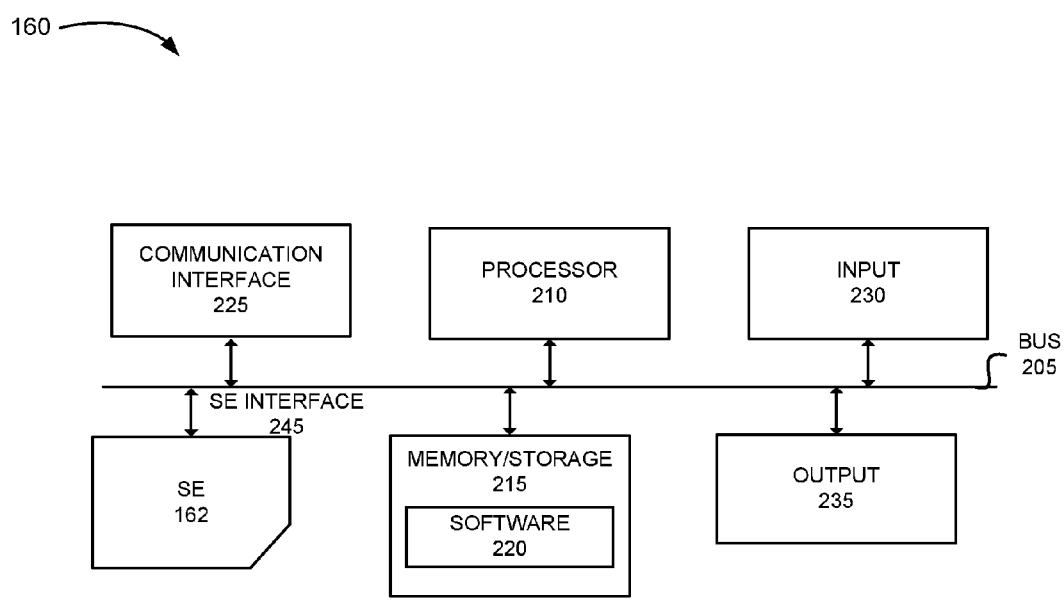
FIG. 2 is a diagram illustrating exemplary components of an end device that provides the multi-active profiles-based network services.

FIG. 2 is a diagram illustrating exemplary components of end device 160. As illustrated in FIG. 2, according to an exemplary embodiment, end device 160 includes a bus 205, a processor 210, memory/storage 215 that stores software 220, a communication interface 225, an input 230, an output 235, an antenna 240, and a secure element interface 245. As further illustrated, end device 160 includes secure element 162. According to other embodiments, end device 160 may include fewer components, additional components, different components, and/or a different arrangement of components than those illustrated in FIG. 2 and described herein. Additionally, although not illustrated, end device 160 may receive power from an internal and/or external source. For example, end device 160 may include an internal power supply (e.g., rechargeable battery, replaceable battery, etc.), and/or use an external power supply (e.g., an outlet, DC power, etc.).

Bus 205 includes one or multiple paths that permit communication among the components of end device 160. For example, bus 205 may include various types of buses, such as a system bus, an address bus, a data bus, a control bus, etc. Bus 205 may also include other types of components, such as bus drivers, bus arbiters, bus interfaces, clocks, etc.

Processor 210 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 210 may be implemented as hardware (e.g., a microprocessor, etc.), a combination of hardware and software (e.g., a SoC, an ASIC, etc.), may include one or multiple memories (e.g., cache, etc.), etc.

Processor 210 may control the overall operation or a portion of operation(s) performed by end device 160. Processor 210 may perform one or multiple operations based on an operating system and/or various applications or computer programs (e.g., software 220). Processor 210 may access instructions from memory/storage 215, from other components of end device 160, and/or from a source external to end device 160 (e.g., a network, another device, etc.). Processor 210 may perform an operation and/or a process based on various techniques including, for example, multithreading, parallel processing, pipelining, interleaving, etc.

Memory/storage 215 includes one or multiple memories and/or one or multiple other types of storage mediums. For example, memory/storage 215 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory, and/or some other type of memory. Memory/storage 215 may include a hard disk (e.g., a magnetic disk, an optical disk, a magneto-optic disk, a solid state disk, etc.) and a corresponding drive. Memory/storage 215 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 215 may include drives for reading from and writing to the storage medium.

Memory/storage 215 may be external to and/or removable from end device 160, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 215 may store data, software, and/or instructions related to the operation of device 200.

Software 220 includes an application or a program that provides a function and/or a process. Software 220 is also intended to include firmware, middleware, microcode, hardware description language (HDL), and/or other form of instruction (e.g., libraries, script, module, etc.). Software 220 includes an operating system (OS). For example, depending on the implementation of end device 160, the operating system may correspond to iOS, Android, Windows Phone, Symbian, or another type of operating system (e.g., proprietary, BlackBerry OS, Windows, Linux, Open AT, eCos, etc.). Software 220 may include various end user applications and/or programs, such as a telephone application, a multi-media application, a video call application, and so forth, as previously described.

Additionally, according to an exemplary embodiment, software 220 includes one or multiple additional protocol stacks, which when executed by a processor (e.g., processor 210, a baseband processor, etc.) provides multi-active profiles-based network services, as described herein.

Communication interface 225 permits end device 160 to communicate with other devices, networks, systems, and/or the like. Communication interface 225 includes a wireless interface. For example, the wireless interface may support one or multiple short-range wireless access technologies (e.g., WiFi, Bluetooth, Zigbee, etc.) and/or one or multiple long-range wireless access technologies (e.g., LTE, CDMA, GSM, etc.). Communication interface 225 may include a wired interface. For example, the wired interface may support various types of broadband connections, such as cable, fiber optic, Ethernet, Universal Serial Bus (USB), etc. Communication interface 225 may also be configured with a communication interface directed to a global navigational satellite system (GNSS) (e.g., Global Positioning System (GPS) receiver and logic), mobile television, and so forth.

Communication interface 225 includes a transmitter and a receiver, or a transceiver. As previously described, according to an exemplary embodiment, end device 160 is a single radio device. According to an exemplary implementation, the radio frequency logic includes a single transmitter chain and a single receiver chain. According to another exemplary implementation, radio frequency logic includes a single transmitter chain and two or more receiver chains that operate on the same frequency. Communication interface 225 may include a baseband modem processor that performs baseband/modem functions. Communication interface 225 may operate according to a protocol stack and a communication standard. Communication interface 225 may include various processing logic or circuitry (e.g., multiplexing/demultiplexing, filtering, amplifying, converting, error correction, etc.). Communication interface 225 includes one or multiple antennas that enable wireless communication. For example, the antenna may be implemented according to various configurations, such as single input single output (SISO), multiple input single output (SIMO), multiple input single output (MISO), or multiple input multiple output (MIMO). The antenna operates according to a frequency band (e.g., 700 MHz, etc.), a communication standard (e.g., an LTE antenna, etc.), and so forth. The antenna may be coupled to long-range wireless access circuitry/logic and/or short-range wireless access circuitry/logic of communication interface 225.

Input 230 permits an input into end device 160. For example, input 230 may include a keyboard, a mouse, a display, a button, a switch, an input port, speech recognition logic, a microphone, a camera, and/or some other type of visual, auditory, tactile, etc., input component. Output 235 permits an output from end device 160. For example, output 235 may include a speaker, a display, a light, an output port, and/or some other type of visual, auditory, tactile, etc., output component. According to some embodiments, input 230 and/or output 235 may be a device that is attachable to and removable from end device 160.

Secure element interface 245 includes a terminal interface that provides operability and communication between end device 160 and secure element 162. Depending on the implementation of secure element 162 (e.g., eUICC, etc.), secure element interface 245 may comport with a particular terminal interface standard (e.g., 3GPP, GSMA, etc.), a proprietary terminal interface, and so forth.

End device 160 may perform a process and/or a function, as described herein, in response to processor 210 executing software 220 stored by memory/storage 215. By way of example, instructions may be read into memory/storage 215 from another memory/storage 215 (not shown) or read from another device (not shown) via communication interface 225. The instructions stored by memory/storage 215 cause processor 210 to perform a process described herein. Alternatively, for example, according to other implementations, end device 160 performs a process described herein based on the execution of hardware (processor 210, etc.). Additionally, or alternatively, end device 160 may perform a process and/or a function based on various combinations of communication interface 225, secure element 162, processor 210 executing software 220, and so forth.

Figure 3:
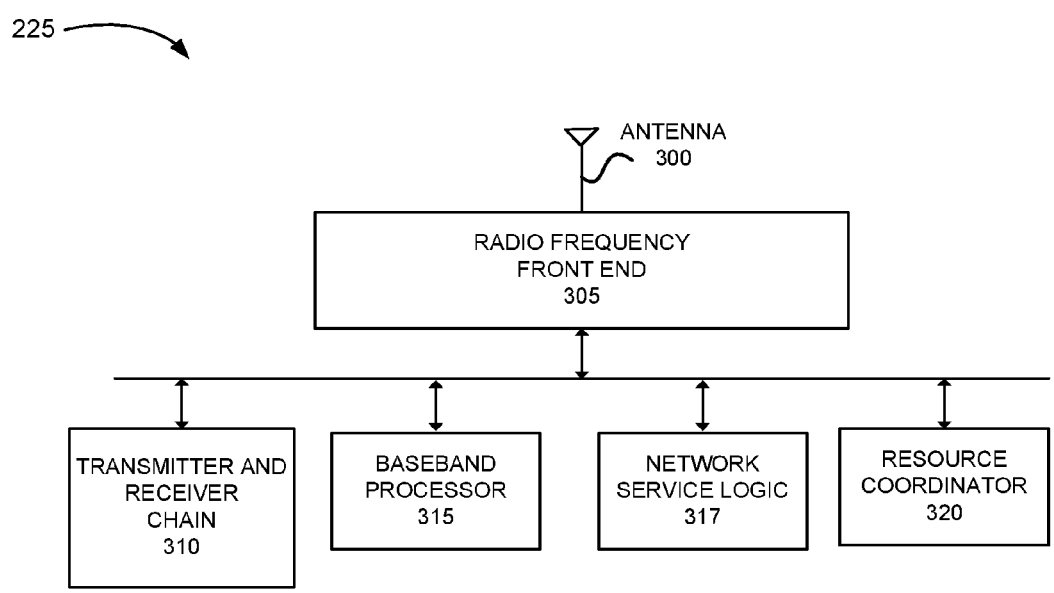
FIG. 3 is a diagram illustrating an exemplary communication interface of the end device.

FIG. 3 is a diagram of exemplary components of communication interface 225. As illustrated, communication interface 225 includes an antenna 300, a radio frequency front end 305, a transmitter and receiver chain 310, a baseband processor 315, network service logic 317, and a resource coordinator 320. According to other embodiments, communication interface 225 may include fewer components, additional components, different components, and/or a different arrangement of components than those illustrated in FIG. 3 and described herein.

Antenna 300 includes antennas that support a transmitter chain and a receiver chain. Antenna 300 may support one or multiple radio access technologies. Antenna 300 may be implemented according to various configurations, as previously described.

Radio frequency front end 305 may include various components that provide an interface between antenna 300 and transmitter and receiver chain 310. For example, radio frequency front end 305 may include a filter, an impedance matching circuit, a radio frequency switch circuit, and so forth.

Transmitter and receiver chain 310 includes a single receiver chain and a single transmitter chain. Alternatively, according to an exemplary implementation, transmitter and receiver chain 310 includes multiple receiver chains and a single transmitter chain. The transmitter chain may include various components, such as, for example, an amplifier, a mixer, a digital-to-analog converter (DAC), a filter, an oscillator, etc. The receiver chain may include various components, such as, for example, an amplifier, a mixer, an analog-to-digital converter (ADC), a filter, an oscillator, etc. When multiple receiver chains are implemented, the receiver chains may share the oscillator or each has its own.

Baseband processor 315 includes various components that provide transmit functions and receive functions. For example, the transmit functions may include encoding, interleaving, mapping, cyclic prefix adding, a Fast Fourier Transfer (FFT) function, and so forth. Additionally, for example, the receive functions may include decoding, de-interleaving, de-mapping, cyclic prefix subtracting, an inverse IFFT function, and so forth. Depending on the wireless access technology, baseband processor 315 may include components different from those described to provide transmit and/or receive functions. Baseband processor 315 may include a memory and/or a storage unit to store data. Baseband processor 315 may also obtain, analyze, and generate various types of information pertaining to signals, such as received signal code power (RSCP) information, signal-to-interference-plus-noise ratio (SINR) information, channel quality indicator (CQI) information, received signal strength indicator (RSSI) information, signal-to-noise ratio (SNR) information, and so forth.

Network service logic 317 includes logic that provides various network service functions pertaining to short-range and/or long-range wireless communications. Network service logic 317 may include various protocol stacks, layers, etc., such as IP, Transmission Control Protocol (TCP), User Datagram Protocol (UDP), Session Initiation Protocol (SIP), Real Time Protocol (RTP), Message Session Relay Protocol (MSRP), Diameter, a domain name system (DNS) stack, a Rich Communication Suite (RCS) stack, an IMS stack, a long-range wireless network stack (e.g., an LTE stack, a CDMA stack, a GSM stack, etc.), a short-range wireless network stack (e.g., a Bluetooth stack, etc.), and so forth to allow communication between end device 160 and an external entity (e.g., network, network device, system, application, service, etc.).

According to an exemplary embodiment, network service logic 317 uses secure element 162 to provide multi-active profiles-based network services, as described herein. For example, an IMS stack, an RCS stack, etc., uses a subscription profile of the list stored by secure element 162 to allow end device 160/user 165 to connect, register, and use a network service (e.g., an IMS service, an RCS service, etc.).

Resource coordinator 320 includes logic to coordinate use of end device 160 (e.g., communication interface 225, etc.) and secure element 162 resources to provide the multi-active profiles-based network services. For example, resource coordinator 320 may include one or multiple algorithms that provide(s) parallel scheduling and/or interleaved scheduling for use of available resources.

Figure 4A:
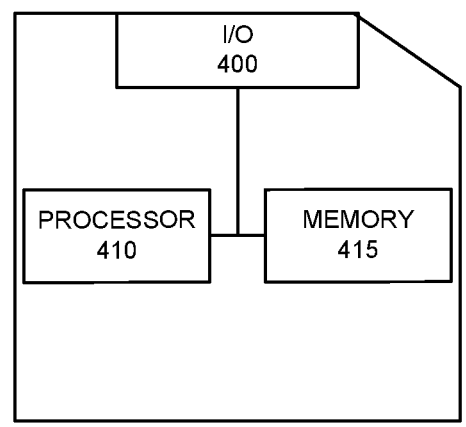
FIG. 4A is a diagram illustrating an exemplary secure element.

FIG. 4A is a diagram illustrating exemplary components of secure element 162. As illustrated, secure element 162 may include input/output circuitry 400, a processor 410, and a memory 415. Input/output circuitry 400 includes circuitry for inputting data to secure element 162 from end device 160 (e.g., via bus 205), and circuitry for outputting data from secure element 162 to end device 160 (e.g., via bus 205). Processor 410 may include a processor, a microprocessor, or processing logic that interprets and executes instructions (e.g., software). Memory 415 may include a RAM, a ROM, an Electrically Erasable Programmable Read-Only Memory (EEPROM), and/or some other type of memory.

Figure 4B:
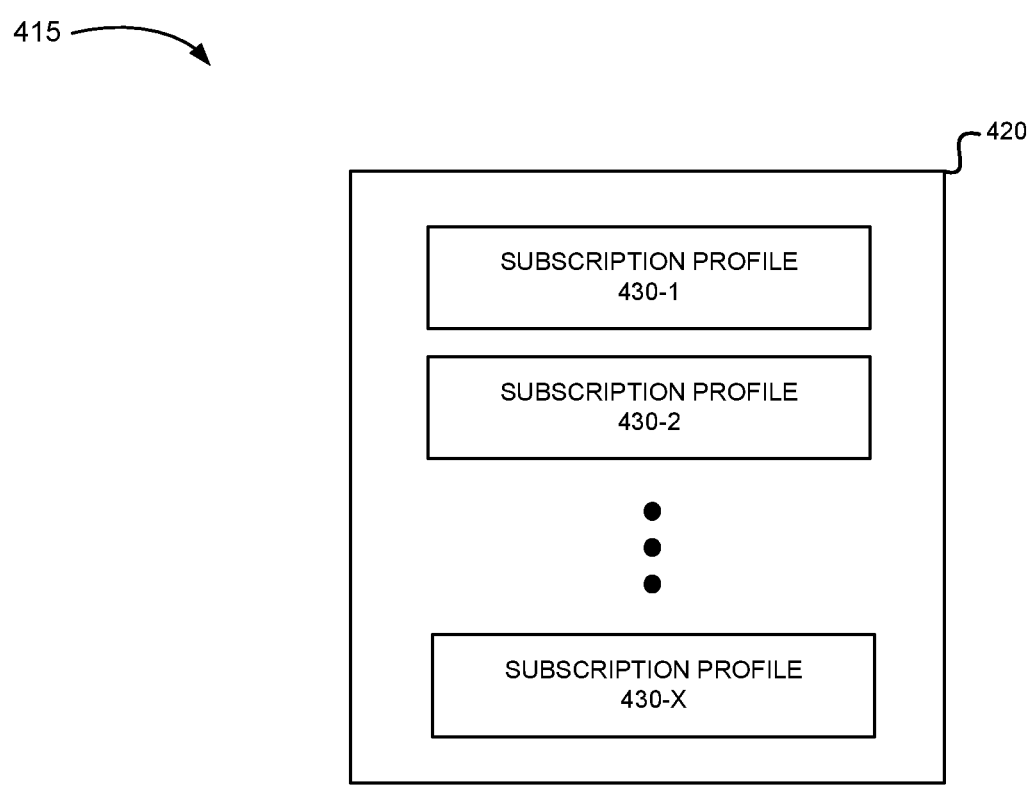
FIG. 4B is a diagram illustrating an exemplary list that includes subscription profiles stored on the secure element.

Memory 415 stores the file or the applet, which includes a list of subscription profiles and permits multiple subscription profiles to be concurrently enabled or active, as described herein. For example, referring to FIG. 4B, memory 415 may store a file 420. File 420 stores a list of subscription profiles 430-1 through 430-X, in which X>1 (referred to as subscription profiles 430 and, individually and generically as subscription profile 430). Multiple numbers of subscription profiles 430 may be concurrently active or enabled.

Referring back to FIG. 4A, memory 415 may store other subscription profiles, which may not be included in the file or the applet. For example, in contrast to the subscription profiles included in the list, these other subscription profiles may not permit multiple subscription profiles to be concurrently enabled relative to each other.

Memory 415 stores software for execution. For example, memory 415 may store an operating system and other entities (e.g., an applet, a program, an application, etc.) to manage various tasks associated with the storage, access, and use of the subscription profiles. By way of example, memory 415 may store various elements that provide various functions analogous to those set forth in the GSMA specification for eUICC, such as secure storage of subscription profiles, management of the lifecycle of subscription profiles, authentication, an access service to the subscription profiles, and so forth. For purposes of description, the GSMA document entitled RSP Architecture, Version 1.0, 23

Dec. 2015, is incorporated herein by reference in its entirety. Additionally, or alternatively, memory 415 may store various elements that provide various functions analogous to those set forth in other specifications, standards, etc. (e.g., an Open Mobile API specification, a GlobalPlatform specification, an International Organization for Standardization (ISO) standard, an International Electrotechnical Commission (IEC) standard), etc.), or various elements of a proprietary nature.

Secure element 162 may perform certain operations or processes in response to processor 410 executing software instructions stored in memory 415. According to other exemplary implementations, secure element 162 may include additional, fewer, and/or different components than those illustrated in FIG. 4A. Additionally, or alternatively, the configuration of components of secure element 162 illustrated in FIG. 4A may be different.

Figure 5:
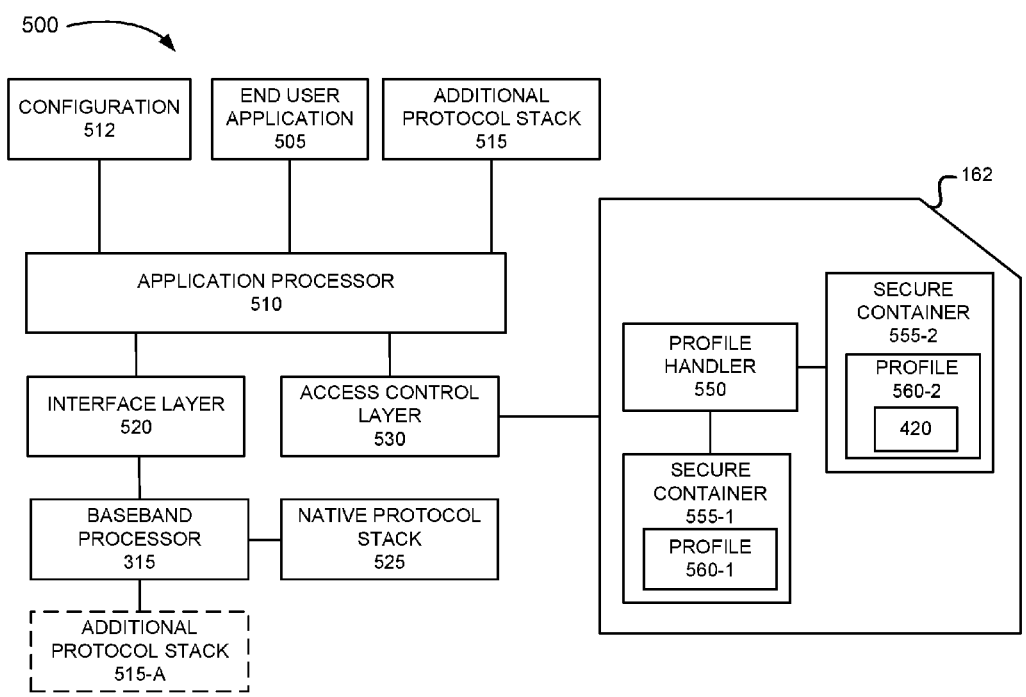
FIG. 5 is a diagram illustrating exemplary components of the multi-active profiles-based network services.

FIG. 5 is a diagram illustrating an exemplary architecture in which an exemplary embodiment of multi-active profiles-based network services may be implemented. As illustrated, architecture 500 includes an end user application 505, an application processor 510, a configuration 512, an additional protocol stack 515, an interface layer 520, a native protocol stack 525, an access control layer 530, a profile handler 550, secure containers 555-1 and 555-2 (also referred to as secure containers 555 and, generically and individually as secure container 555), and profiles 560-1 and 560-2 (also referred to as profiles 560 and, generically and individually as profile 560). The number and type of components are exemplary. According to other embodiments, architecture 500 may include an additional component, a different component, and/or fewer components than those illustrated in FIG. 5. Additionally, the arrangement of components of architecture 500 and the connections are exemplary. A connection may be implemented as a physical connection (e.g., a bus, etc.) or another type of link (e.g., inter-application communication, inter-process communication, etc.). The exemplary architecture may be implemented based on components previously described.

End user application 505 may be implemented as an end user application, such as a telephone application, a messaging application, a browser, and so forth, as previously described. Application processor 510 may include a processor of a type previously described in relation to processor 210. According to an exemplary implementation, application processor 510 executes the additional protocol stack 515 (e.g., in the application layer). According to another exemplary implementation, baseband processor 315 may execute additional protocol stack 515 (e.g., in the communication layer).

Configuration 512 includes data and/or logic that allows end device 160 to know with what network device to establish a connection and how to establish a connection. For example, configuration 512 may include a network address of the network device with which to establish a connection and the protocol(s) or other communicative configurations to use so that a network service can be accessed and used. By way of further example, configuration 512 may include an access point name (APN) setting (e.g., home APN, visited APN, Internet APN, IMS APN, etc.), a network service address, and so forth. According to an exemplary implementation, configuration 512 may be downloaded and stored based on a user preference. For example, user 165 may indicate certain preferences pertaining to a network service in terms of type (e.g., voice, messaging, etc.), network service provider (e.g., provider X, provider Y, etc.), and/or other parameters (e.g., cost, location of user, time of day, etc.).

Additional protocol stack 515 includes software, such as, for example, a set of libraries, executables, and/or a program that manages the access and enablement of a network service based on profile 560 stored on secure element 162. For example, when executed, additional protocol stack 515 may generate SIP messages, open a socket, establish a connection to the network service via the socket and an APN or via the socket and the Internet, obtain credentials from secure element 162, manage signaling, manage media, and so forth. One or multiple additional protocol stacks may be implemented in the application layer, the baseband layer, both, etc. For example, as illustrated by dashed lines, additional protocol stack 515-A may be implemented in the baseband/modem layer.

Interface layer 520 includes logic that provides an interface to the radio and modem hardware of end device 160. For example, interface layer 520 may provide an interface between application processor 510 and baseband processor 315. Interface layer 520 may transmit various commands (e.g., AT commands, solicited commands, unsolicited commands, etc.) and receive various responses so as to use modem applications, functionalities, and so forth. Interface layer 520 may be implemented in the operating system. For example, interface layer 520 may be implemented to include a radio interface layer (e.g., an Android RIL, a Windows Phone RIL, etc.).

Native protocol stack 525 includes software, such as, for example, a set of libraries, executables, and/or a program that manages the access and enablement of a network service based on a subscription profile stored on secure element 162. For example, when executed, native protocol stack 525 may provide services similar to those described in relation to additional protocol stack 515 and/or described elsewhere in this description.

Access control layer 530 includes logic that provides access and use of secure element 162. For example, end user application 505 and additional protocol stack 515 may communicate to profile handler 550 via access control layer 530. Access control layer 530 may include various service layer application programming interfaces (APIs) and/or transport layer APIs to allow access and communication between secure element 162 and other elements (e.g., end user application 505, additional protocol stack 515, software, etc.) of end device 160. For example, access control layer 530 may be implemented based on an Open Mobile API Specification (e.g., version 3.2 (2016) of SIMalliance, which is incorporated by reference in its entirety) and/or some other type of API service or communication logic. Additionally, or alternatively, access control layer 530 may be implemented based on a GlobalPlatform Specification (e.g., Secure Element Access Control version 1.0, ref. GPD-_SPE_013, which is incorporated by reference in its entirety, a Trusted Execution Environment (TEE) specification, etc.) and/or some other type of access rights logic.

Profile handler 550 includes logic that provides access to profiles 560 stored on secure element 162. For example, profile handler 550 provides a discovery or a lookup service that searches, locates, selects, and/or identifies one or multiple subscription profiles and provides access information. By way of example, access information may include an address (e.g., a subscription profile address, an applet address or a module address, etc.), an identifier (e.g., an application identifier (AID), a subscription profile identifier, etc.), metadata pertaining to the subscription profile, and so forth pertaining to the access of a subscription profile. According to an exemplary implementation, profile handler 550 may be an element that complements or is a counterpart to an element of access control layer 530. For example, access control layer 530 may include a profile handler that requests and obtains access information of a subscription profile. By way of further example, profile handler 550 and the profile handler may be implemented based on the discovery service described in the Open Mobile API Specification in which an application can look up or discover a secure element and an applet/module. The application (e.g., additional protocol stack 515) may communicate with profile handler 550 via access control layer 530 using application protocol data units (APDUs). For example, APDUs of the ISO/IEC 7816 standard may be used. According to an exemplary embodiment, profile handler 550 can provide access information for multiple subscription profiles to allow the multiple subscription profiles to be enabled or active at the same time. According to an exemplary embodiment, subscription profiles (e.g., profile 560-1, profile 560-2) are registered with profile handler 550 to enable profile handler 550 to provide the discovery service.

Secure container 555 includes a secure domain or a secure memory space that stores profile 560. For example, under an eUICC architecture of the GSMA standard, profile 560-1 may be stored in an Issuer Security Domain Profile (ISD-P). While the eUICC architecture of the GSMA standard does not provide for profile 560-2, as described herein, according to an exemplary implementation, profile 560-2 is stored in or a part of the operating system of secure element 162. For example, profile 560-2 may be stored as an element of a telecom framework (e.g., an operating system service). According to another example, profile 560-2 may be stored as a new element of the operating system that is outside of or not a part of the telecom framework. According to another exemplary implementation, profile 560-2 is stored outside or not a part of the operating system of secure element 162. For example, profile 560-2 may be stored in an ISD-P or in a new element that hosts profile 560-2.

According to an exemplary implementation, profile 560-2 may be a part of a master file (MF) or a dedicated file (DF) of a file system. For example, the file system may be implemented based on eUICC Profile Package: Interoperable Format Technical Specification (e.g., version 1.0 (25 Jun. 2015) of SIMalliance, which is incorporated by reference in its entirety) and/or other standards (e.g., ISO/IEC 7816, etc.). According to another exemplary implementation, profile 560-2 may be a part of a file system that is proprietary in nature. Profile 560-1 includes a subscription profile. Profile 560-2 includes file 420.

Figure 6A:
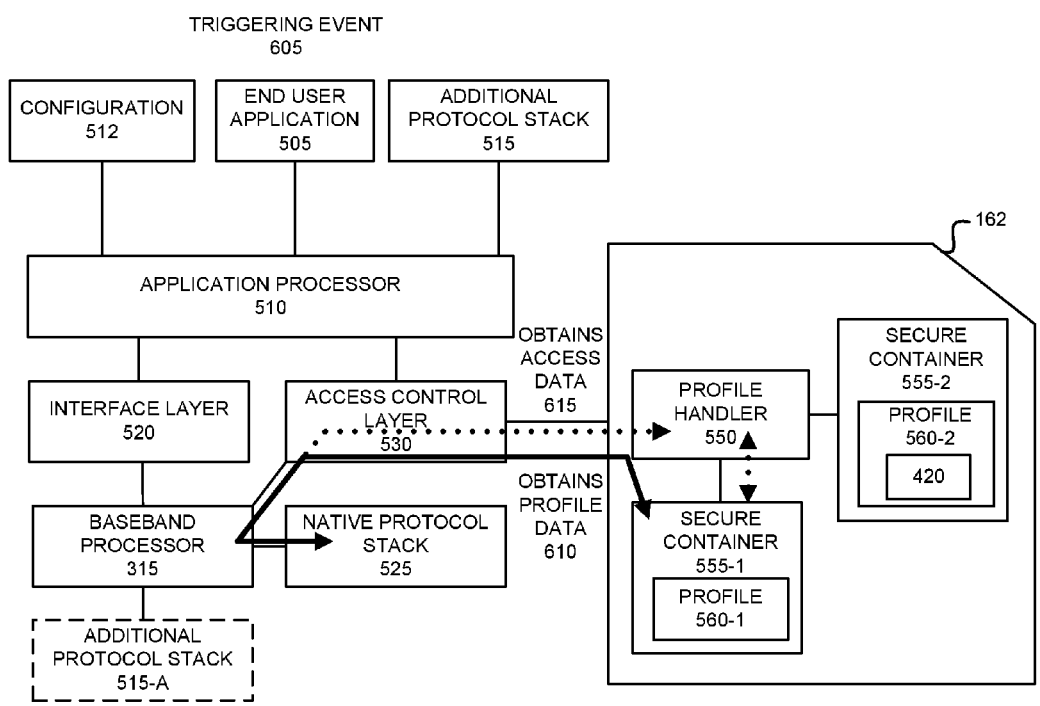
FIGS. 6A-6F are diagrams illustrating exemplary processes of the multi-active profiles-based network services performed at the end device.

FIGS. 6A-6F are diagrams illustrating exemplary processes for multi-active profiles-based network services. Referring to FIG. 6A, assume that a triggering event 605 occurs at end device 160. For example, triggering event 605 may be when user 165 powers on end device 160 (e.g., boot-up). Alternatively, triggering event 605 may be some other type of event. For example, triggering event 605 may correspond to user 165 opening a particular end user application, which is used to provide a particular network service (e.g., a telephone service, etc.). The "particular" end user application may be identified based on a user preference or some other data stored at end device 160. According to other exemplary implementations, other criteria may be used. For example, triggering event 605 may include a triggering event that is directed solely to whether a second, a third, etc., network service is established for use. By way of example, user 165 may prefer that additional protocol stack 515 (and/or additional protocol stack 515-A) is invoked to establish the second, the third, etc., network service(s) based on location criterion (e.g., preferred locations, such as work, etc.), mode criterion (e.g., a work mode or a personal mode within which end device 160 operates), a time of day, a day of week, or other user configurable criterion. Additionally, for the example, the user preference data may indicate the type of network service (e.g., voice, etc.). As previously described, configuration 512 may include various types of user preferences.

Figure 6B:
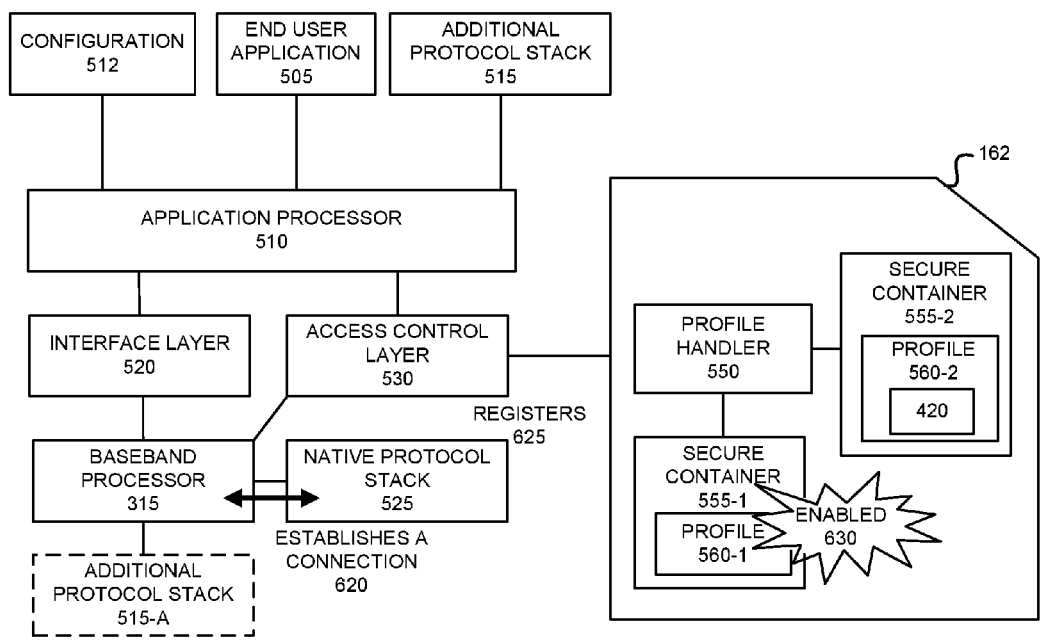

In response to triggering event 605, native protocol stack 525 obtains profile data 610 of profile 560-1 via access control layer 530. According to an exemplary implementation, native protocol stack 525 may not use the discovery service of profile handler 550. For example, native protocol stack 525 may be configured with access information. For example, profile 560-1 may be a default profile that end device 160 normally (e.g., by default) uses. According to another exemplary implementation, native protocol stack 525 obtains access data 615 of profile 560-1 via access control layer 530 and profile handler 550 (illustrated as a dotted line). Thereafter, in response to receiving access data 615, native protocol stack 525 obtains profile data 610. Referring to FIG. 6B, subsequent to obtaining the profile data of profile 560-1, native protocol stack 525 establishes a connection 620 and registers 625 the end device/user with a network service. As illustrated, profile 560-1 is in an "enabled" state 630.

Figure 6C:
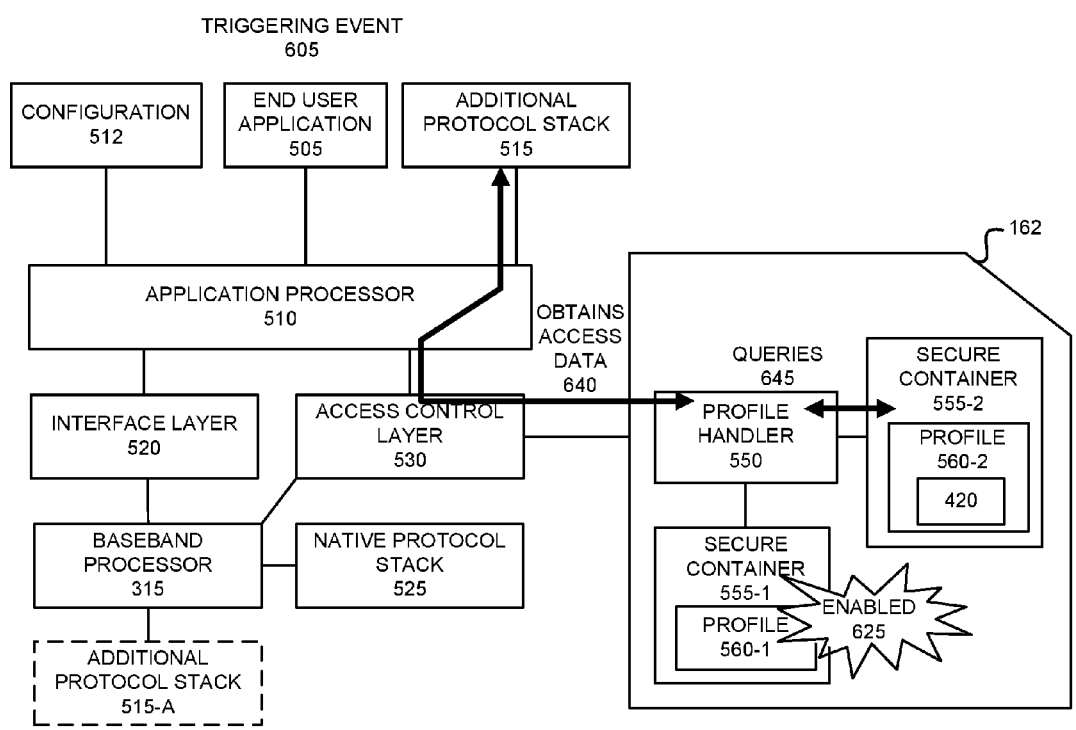

Referring to FIG. 6C, in response to triggering event 605, additional protocol stack 515 obtains access data 640 of profile 560-2 via access control layer 530 and profile handler 550. According to an exemplary embodiment, additional protocol stack 515 may be configured such that its access rights to subscription profiles are limited to those stored in profile 560-2 (e.g., file 420). That is, additional protocol stack 515 may not access any profile stored on secure element 162. According to other exemplary embodiments, additional protocol stack 515 may not be configured in a manner that restricts access to profiles.

To obtain access data 640, additional protocol stack 515 may generate, for example, an APDU or other type of container directed to profile handler 550. According to an exemplary implementation, the container includes criteria data pertaining to candidate profiles to be discovered. For example, the criteria data may indicate a particular MNO, a particular AID (or other type of access information), a particular network service, and/or some other type of configurable criterion or criteria. According to another exemplary implementation, the container may not include criteria data pertaining to candidate profiles to be discovered. In either implementation, additional protocol stack 515 may transmit the container via a channel established to profile handler 550. In response to receiving the container, profile handler 550 queries profile 560-2 (illustrated as queries 645). According to an exemplary implementation, when the container includes criteria data, profile handler 550 uses a matching algorithm to select a subscription profile that matches one or multiple criteria included in the container. As previously described, file 420 may include one or multiple subscription profiles and each subscription profile may be associated with metadata. Profile handler 550 uses the matching algorithm to determine whether the one or multiple criteria match the metadata of the one or multiple subscription profiles. For purposes of description, assume that at least one of the subscription profiles stored in file 420 matches the criteria data (e.g., partially or fully). Based on a result of the query, profile handler 550 provides access information (e.g., access data 640) of the subscription profile, which included the matching metadata, to additional protocol stack 515. As an aside, in the event that no match exists, additional protocol stack 515 may modify its criteria or not include any criteria in another container, and re-request for access information to a subscription profile stored in profile 560-2/file 420.

According to another exemplary implementation, when the container does not include criteria data, profile handler 550 may provide access information associated with each subscription profile of profile 560-2 that is not enabled (e.g., access data 640) to additional protocol stack 515. According to an exemplary implementation, profile handler 550 packages the access information for presentation to additional protocol stack 515 based on a prefigured priority. For example, index data may be used that represents an order of priority of the access information. For example, [0] is reserved for the access information associated with a subscription profile used for a default service, [1] is for the access information associated with a subscription profile for a secondary service, [2] is for the access information associated with a subscription profile for a third service, and so forth. The index data may be based simply on an order in which the subscription profiles are stored in list 420 or some other criteria. In this case, even if a default subscription profile is not yet enabled, when access data 640 is received by additional protocol stack 515, additional protocol stack 515 could use the index data as a basis for not selecting the access information of a default subscription profile used for the default service.

Figure 6D:
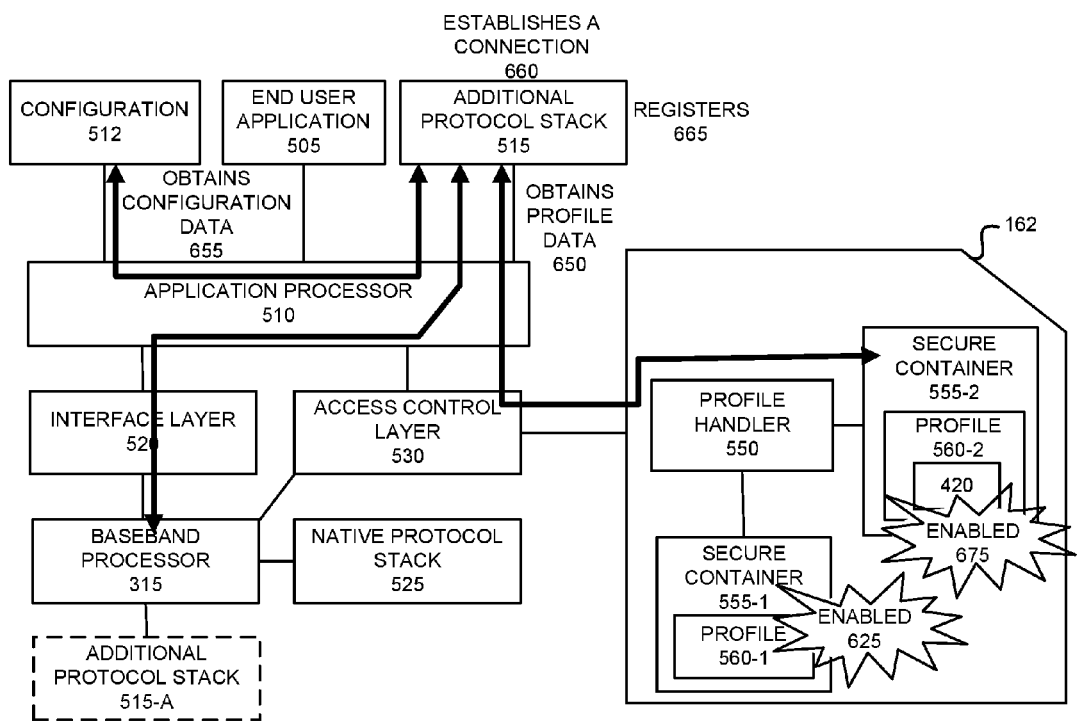

Referring to FIG. 6D, in response to obtaining access data 640, additional protocol stack 515 obtains profile data 650. According to an exemplary implementation, when the container includes the criteria data, additional protocol stack 515 uses the access information to obtain profile data 650 (e.g., a subscription profile) corresponding to the access information. According to another exemplary implementation, when the container does not include the criteria data, additional protocol stack 515 uses access data 640 to obtain profile data 650 (e.g., one or multiple subscription profiles). Additional protocol stack 515 uses the metadata associated with each subscription profile and/or the index data, to select the subscription profile.

Subsequent to obtaining profile data 650, additional protocol stack 515 obtains configuration data 655. For example, configuration data 655 may indicate the network device with which to establish to establish a connection and other communication configurations, as previously described. Additionally, when there are multiple candidate subscription profiles to select from, regardless of whether the container included criteria data or not, additional protocol stack 515 may use user preference data or other data stored in configuration 512 as a basis to select one candidate subscription profile over another. For example, the user preference may include context information (e.g., location of user, time of day, etc.), or configuration 512 may store other types of information (e.g., historical data including number of times subscription profile used, length of time network service used by the user, etc.) which may not be stored as metadata associated with the subscription profile. By way of further example, a subscription profile may be limited for selection by virtue of the user's current location (e.g., United States versus overseas), and so forth. Subsequent to obtaining configuration data 655, additional protocol stack 515 establishes a connection 660 and registers 665 the end device/user with a network service. As illustrated, a subscription profile of file 420 is in an "enabled" state 675.

Figure 6E:
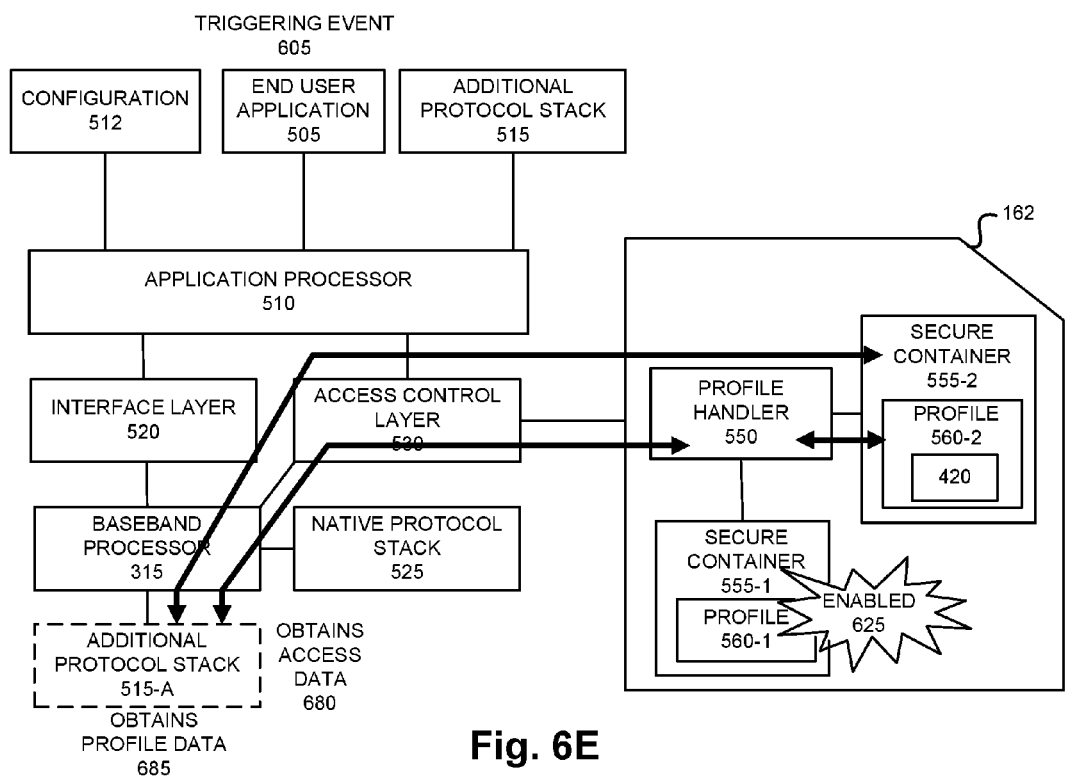
Figure 6F:
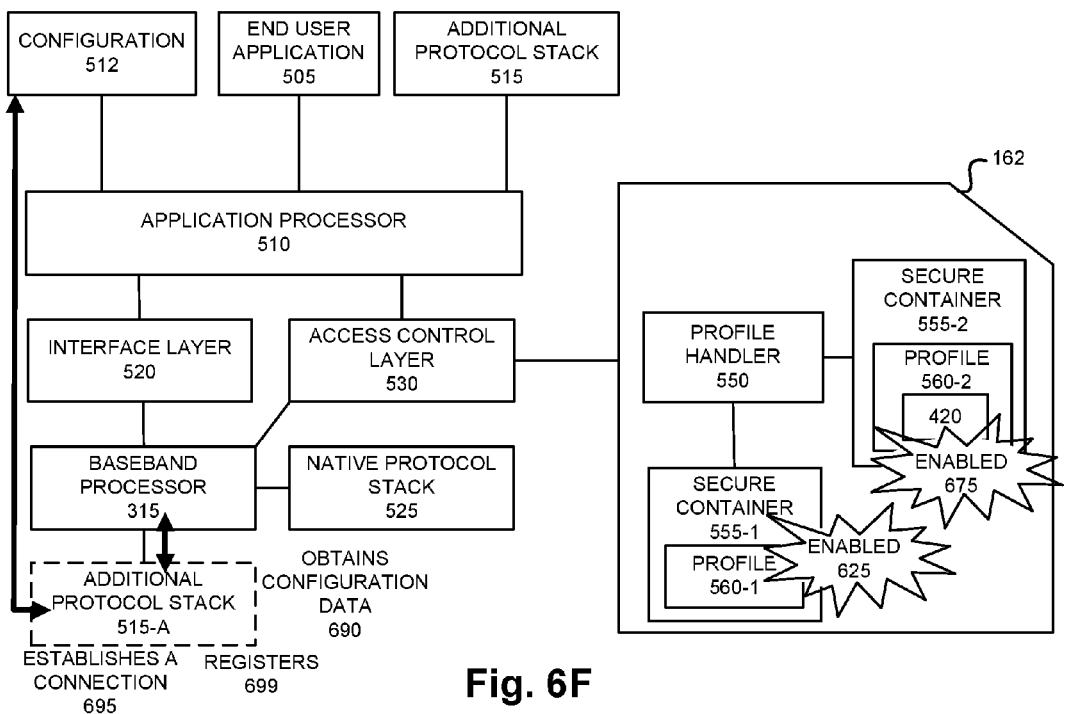

For the sake of description, FIGS. 6E and 6F are directed to another exemplary embodiment in which additional protocol stack 515-A may operate in the baseband/modem layer. Additional protocol stack 515-A may perform operations similar to those described in relation to additional protocol stack 515. For example, referring to FIG. 6E, in response to triggering event 605, additional protocol stack 515-A obtains access data 680 and obtains profile data 685 based on the access data 680. Referring to FIG. 6F, additional protocol stack 515-A obtains configuration data 690, establishes a connection 695, and registers 699 the end device 160/user 165 with a network service.

Although FIGS. 6A-6F illustrate exemplary processes of the multi-active profiles-based network service, according to other embodiments, additional operations, fewer operations, and/or different operations than those illustrated in FIGS. 6A-6F and described herein may be performed.

Figure 7A:
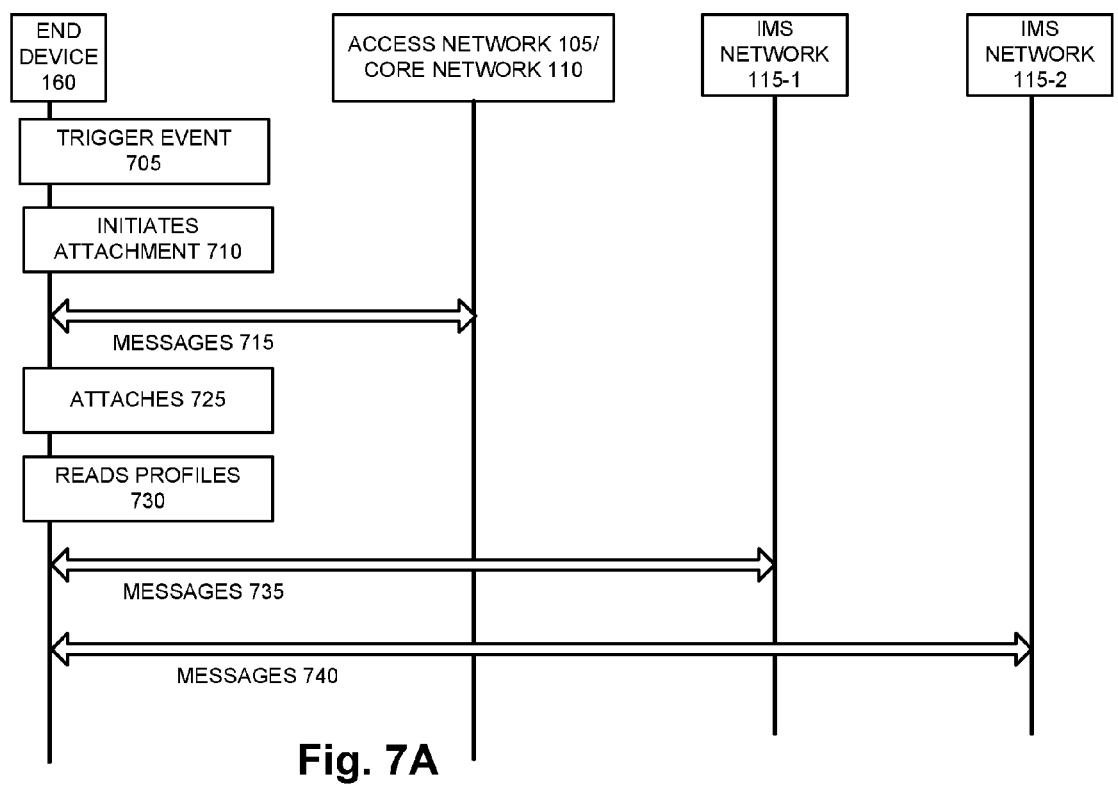
FIGS. 7A and 7B are diagrams illustrating an exemplary process of the multi-active profiles-based network services between the end device and the network services.
Figure 7B:
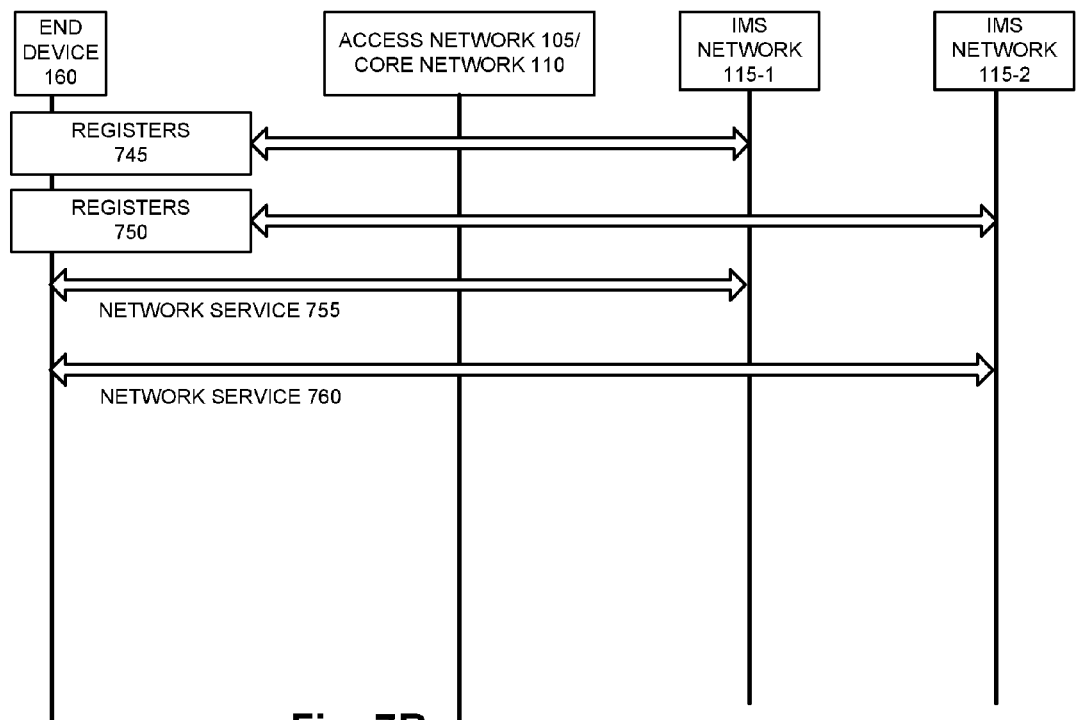

FIGS. 7A and 7B are diagrams illustrating an exemplary process of the multi-active profiles-based network services. Referring to FIGS. 1 and 7A, a triggering event 705 occurs, such as end device 160 powering up. As a part of a boot-up process, end device 160 initiates attachment 710 with access network 105/core network 110. During that attachment process, messages 715 are communicated between end device 160 and access network 105/core network 110, which results in end device 160 becoming attached 725. Subsequent to attachment, end device 160 reads profiles 730 stored on secure element 162. For example, one subscription profile may be a default subscription profile for IMS services and another subscription profile for IMS services stored in file 420. In response, end device 160 establishes connections with IMS network 115-1 and IMS network 115-2 by way of messages 735 and messages 740, respectively. Referring to FIG. 7B, subsequent to the establishment of these connections, end device 160 registers with IMS networks 115-1 and 115-2. For example, end device 160 uses credentials included in each of the subscription profiles to register user 165/end device 160. Subsequent to successful registrations, end device 160 receives network services 755 and 760 from IMS networks 115-1 and IMS network 115-2.

Figure 8A:
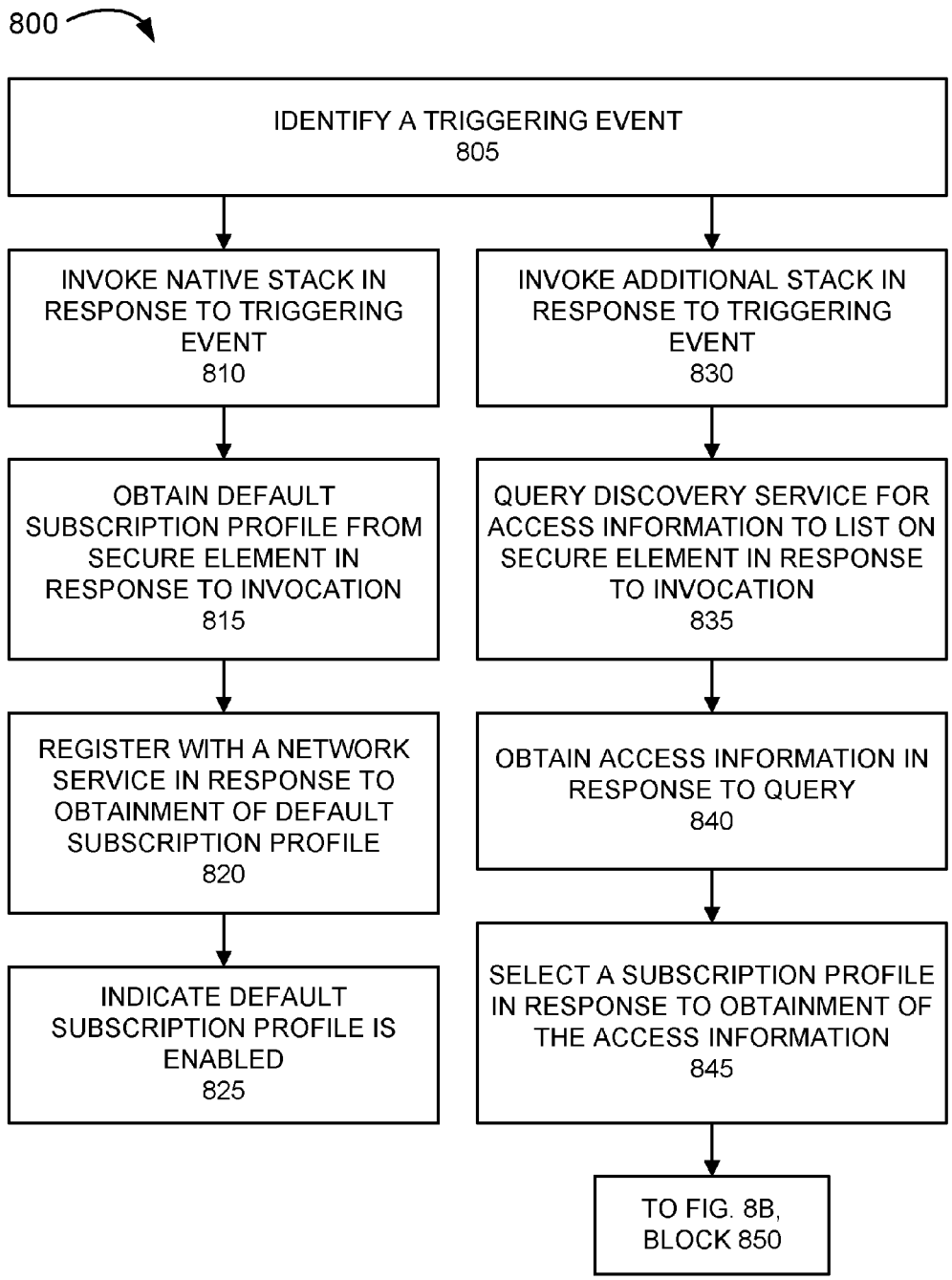
FIGS. 8A and 8B are flow diagrams illustrating an exemplary process of the multi-active profiles-based network services.
Figure 8B:
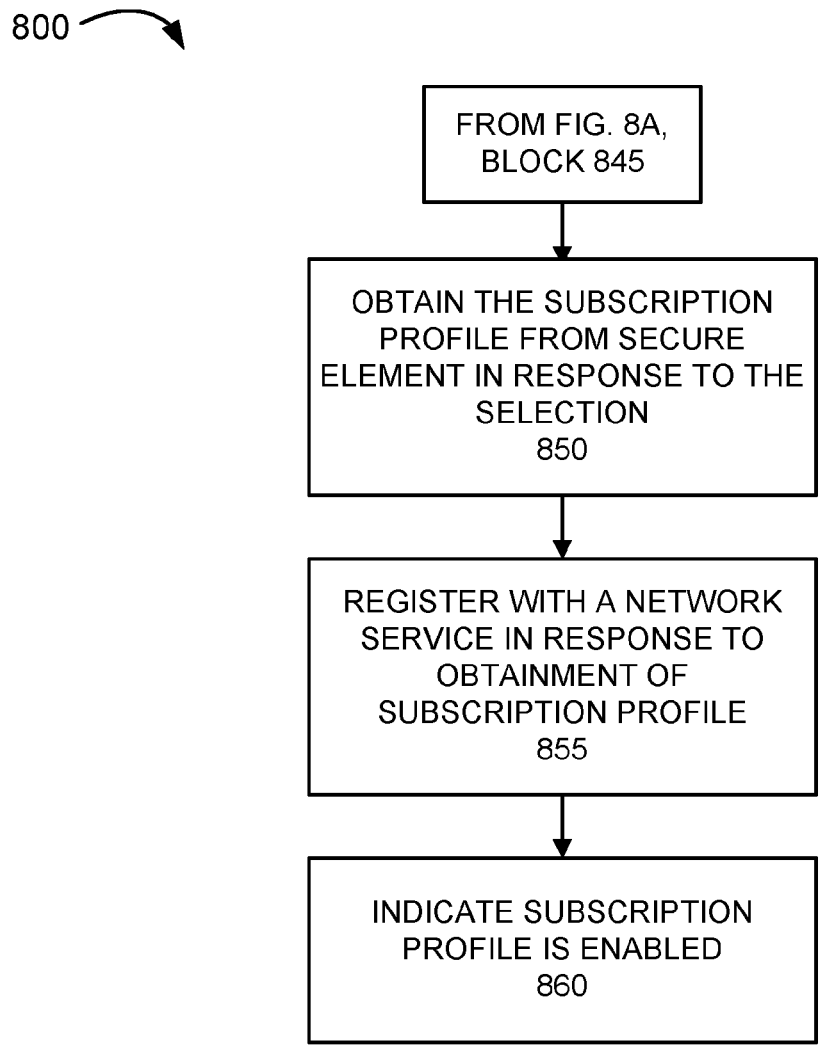

FIGS. 8A and 8B are flow diagrams illustrating an exemplary process 800 of the multi-active profiles-based network services. Process 800 is directed to a process previously described above with respect to FIGS. 6A-6F, as well as elsewhere in this description, in which multi-active profile-based network services are provided. According to an exemplary embodiment, end device 160, which includes secure element 162, performs steps of process 800. According to an exemplary embodiment, blocks 805-825 (or portions thereof) may be performed in parallel relative to blocks 805 and 830-860 (or portions thereof). According to other exemplary embodiments, blocks 805-825 (or portions thereof) may not be performed in parallel relative to blocks 805 and 830-860 (or portions thereof).

Referring to FIG. 8A, block 805, process 800 may begin with a triggering event being identified. For example, the triggering event may be identified end device 160 is powered on or when user 165 opens up an end user application. The triggering event for the native (or default) stack may be different than for the additional stack. For example, the triggering event for the default stack may be the boot-up process and the triggering event for the additional stack may be a user preference. According to another example, the triggering event for the native stack may be the opening of the end user application for the native stack, and the triggering event for the additional stack may be the opening of the end user application and the user preference. Alternatively, the triggering event may be the same for both the native stack and the additional stack.

In block 810, a native stack is invoked in response to the identification of the triggering event. For example, native protocol stack 525 may be invoked in response to a detection of the triggering event. In block 815, a default subscription profile is obtained from the secure element in response to the invocation. According to one example, native protocol stack 525 may obtain access information (e.g., via profile handler 550). According to another example, native protocol stack 525 may be pre-configured or have access to the access information (e.g., stored in a file, etc.) without using the discovery service of profile handler 550. For either implementation, based on the receipt of the access information, native protocol stack 525 uses the access information to obtain a (default) subscription profile (e.g., profile 560-1).

In block 820, the end device and/or the user register(s) with a network service in response to the obtainment of the default subscription profile. For example, native protocol 525 establishes a connection with a network device and uses the default subscription profile (e.g., credentials, etc.) to register end device 160 and/or user 165 with the network service.

In block 825, the default subscription profile is enabled. For example, end device 160 indicates that the default subscription profile is enabled.

In block 830, an additional stack is invoked in response to the identification of the triggering event. As previously described in block 805 elsewhere, the triggering event may be the same or different from the triggering event for the native stack.

In block 835, a discovery service is queried for access information to a list stored on the secure element in response to the invocation. For example, additional protocol stack 515 may generate and transmit an APDU or other type of container to profile handler 550 via access control layer 530. The container may or may not include criteria data.

In block 840, access information is obtained in response to the query. For example, additional protocol stack 515 obtains access information from profile handler 550 via access control layer 530.

In block 845, a subscription profile is selected in response to the obtainment of the access information. For example, additional protocol stack 515 selects a subscription profile that is stored in file 420. Additional protocol stack 515 may use metadata to make the selection. Additional protocol stack 515 may use other data (e.g., index data, user preference data, etc.).

Referring to FIG. 8B, in block 850, the subscription profile is obtained based on the selection. For example, additional protocol stack 515 uses the access information to obtain the subscription profile (e.g., subscription profile 430) of file 420.

In block 855, the end device and/or the user register(s) with a network service in response to the obtainment of the subscription profile. For example, additional protocol stack 515 establishes a connection with a network device and uses the subscription profile (e.g., credentials, etc.) to register end device 160 and/or user 165 with the network service.

In block 860, the subscription profile is enabled. For example, end device 160 indicates that the subscription profile is enabled.

Although FIGS. 8A and 8B illustrate an exemplary process 800 of the multi-active profiles-based network services, according to other embodiments, process 800 may include additional operations, fewer operations, and/or different operations than those illustrated in FIGS. 8A and 8B, and described herein.

The foregoing description of embodiments provides illustration, but is not intended to be exhaustive or to limit the embodiments to the precise form disclosed. Accordingly, modifications to the embodiments described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIGS. 8A and 8B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software executed by hardware. For example, a process or a function may be implemented as "logic" or as a "component." The logic or the component may include, for example, hardware (e.g., processor 210, baseband processor 315, etc.), or a combination of hardware and software (e.g., software 220, etc.). The embodiments have been described without reference to the specific software code since the software code can be designed to implement the embodiments based on the description herein and commercially available software design environments and/or languages.

In the preceding specification, various embodiments have been described with reference to the accompanying drawings. However, various modifications and changes may be made thereto, and additional embodiments may be implemented, without departing from the broader scope of the invention as set forth in the claims that follow. For example, although an exemplary embodiment of end device 160 includes that end device 160 is a single radio device, according to another exemplary embodiment, end device 160 may not be single radio device. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The word "exemplary" is used herein to mean "serving as an example." Any embodiment or implementation described as "exemplary" is not necessarily to be construed as preferred or advantageous over other embodiments or implementations.

Additionally, embodiments described herein may be implemented as a non-transitory storage medium that stores data and/or information, such as instructions, program code, data structures, program modules, an application, etc. The program code, instructions, application, etc., is readable and executable by a processor (e.g., processor 210, baseband processor 315, etc.) of a computational device. A non-transitory storage medium includes one or more of the storage mediums described in relation to memory/storage 215.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Any reference to a particular standard, specification, etc., in this description is meant to serve as an example. According to the embodiments described herein, components, architectures, and so forth may be implemented based on a standard and/or a technical specification, a modification thereof, a proprietary framework or platform, etc.

No element, act, or instruction described in the present application should be construed as critical or essential to the embodiments described herein unless explicitly described as such.

What is claimed is:

1. A method comprising:
   storing, by a wireless end device, multiple subscription profiles on a secure element of the wireless end device;
   detecting, by the wireless end device, a triggering event;
   using, by a first Internet Protocol Multimedia System (IMS) stack of the wireless end device, one of the subscription profiles to register with a first network service via a first network in response to the detecting;
   indicating that the one of the subscription profiles is enabled;
   querying, by a second IMS stack of the wireless end device, the secure element for another one of the subscription profiles in response to the detecting;
   obtaining, by the second IMS stack of the wireless end device, access information to the other one of the subscription profiles in response to the querying;
   selecting, by the second IMS stack of the wireless end device, the other one of the subscription profiles in response to the obtaining;
   using, by the second IMS stack of the wireless end device, the other one of the subscription profiles to register with a second network service via a second network in response to the selecting; and
   indicating that the other one of the subscription profiles is enabled.

2. The method of claim 1, wherein the querying further comprises:
   generating an application protocol data unit; and
   transmitting the application protocol data unit to a discovery service of the secure element.

3. The method of claim 2, wherein the application protocol data unit includes criteria data that indicates one or more criteria to be used to select another one of the subscription profiles, and the method further comprising:
   determining whether the criteria data matches metadata associated with another one of the subscription profiles; and
   selecting the other one of the subscription profiles in response to determining that metadata associated with the other one of the subscription profiles matches the criteria data.

4. The method of claim 1, wherein the first network service and the second network service are of a same type of service.

5. The method of claim 1, wherein the second IMS stack operates in an application layer of the wireless end device and the first IMS stack operates in a baseband layer of the wireless end device.

6. The method of claim 1, wherein the other one of the subscription profiles is stored in or is a part of an operating system of the secure element.

7. The method of claim 6, wherein the secure element is one of a Universal Integrated Circuit Card (UICC) or an embedded UICC.

8. The method of claim 1, wherein the wireless end device is a single radio device.

9. An end device comprising:
   a secure element, wherein the secure element stores multiple subscription profiles;
   a communication interface, wherein the communication interface is configured to transmit and receive signals wirelessly;
   a memory, wherein the memory stores software, and wherein the software includes a first Internet Protocol Multimedia Subsystem (IMS) stack and a second IMS stack; and
   a processor, wherein the processor executes the software to:
      detect a triggering event;
      use, by the first IMS stack and via the communication interface, one of the subscription profiles to register with a first network service via a first network in response to the detection;
      indicate that the one of the subscription profiles is enabled;
      query, by the second IMS stack, the secure element for another one of the subscription profiles in response to the detection;
      obtain, by the second IMS stack, access information to the other one of the subscription profiles in response to the query;
      select, by the second IMS stack, the other one of the subscription profiles in response to the obtainment;
      use, by the second IMS stack and via the communication interface, the other one of the subscription profiles to register with a second network service via a second network in response to the selection; and
      indicate that the other one of the subscription profiles is enabled.

10. The end device of claim 9, wherein the access information pertains to two or more subscription profiles of the subscription profiles, the processor further executes the software to:
   obtain the two or more subscription profiles based on the access information, wherein each of the two or more subscription profiles includes metadata, and wherein when selecting, the processor further executes the software to:
   analyze the metadata associated with each of the two or more subscription profiles; and
   select one of the two or more subscription profiles based on the analysis, wherein the one of the two or more subscription profiles is the other one of the subscription profiles.

11. The end device of claim 9, wherein when querying, the processor further executes the software to:
   generate an application protocol data unit; and transmit the application protocol data unit to a discovery service of the secure element.

12. The end device of claim 9, wherein the second IMS stack operates in an application layer of the end device and the first IMS stack operates in a baseband layer of the end device.

13. The end device of claim 9, wherein the other one of the subscription profiles is stored in or is a part of an operating system of the secure element.

14. The end device of claim 13, wherein the secure element is one of a Universal Integrated Circuit Card (UICC) or an embedded UICC.

15. The end device of claim 9, wherein the end device is a single radio device.

16. The end device of claim 9, wherein the triggering event is one of a powering-up of the end device or receipt of a user input to open an end user application of the end device.

17. A non-transitory, computer-readable storage medium storing instructions executable by a processor of a computational device, which when executed cause the computational device to:
  detect a triggering event;
  use, by a first Internet Protocol Multimedia Subsystem (IMS) stack, a first subscription profile stored on a secure element to register with a first network service via a first network in response to the detection;
  query, by a second IMS stack, the secure element for a second subscription profile in response to the detection;
  obtain, by the second IMS stack, access information to the second subscription profile in response to the query, wherein the first subscription profile and the second subscription profile are different;
  select, by the second IMS stack, the second subscription profile in response to the obtainment; and
  use, by the second IMS stack, the second subscription profile to register with a second network service via a second network in response to the selection, wherein the first subscription profile and the second subscription profile are enabled.

18. The non-transitory, computer-readable storage medium of claim 17, wherein the instructions to query further comprise instructions to:
  generate an application protocol data unit; and
  transmit the application protocol data unit to a discovery service of the secure element via an access control service of the computational device.

19. The non-transitory, computer-readable storage medium of claim 18, wherein the application protocol data unit includes criteria data that indicates one or more criteria to be used to select the second subscription profile, and wherein the instructions to query further comprise instructions to:
  determine whether the criteria data matches metadata associated with another one of the subscription profiles; and
  select the second subscription profile in response to a determination that metadata associated with the second subscription profile matches the criteria data.

20. The non-transitory, computer-readable storage medium of claim 17, wherein the second IMS stack operates in an application layer of the computational device and the first IMS stack operates in a baseband layer of the computational device.

* * * * *